Nov. 29, 1955

J. L. MAHONEY 2,725,020

STABILIZER FOR REEL OVEN

Filed March 5, 1949

Inventor:
Joseph L. Mahoney
By Bair & Freeman
Attys.

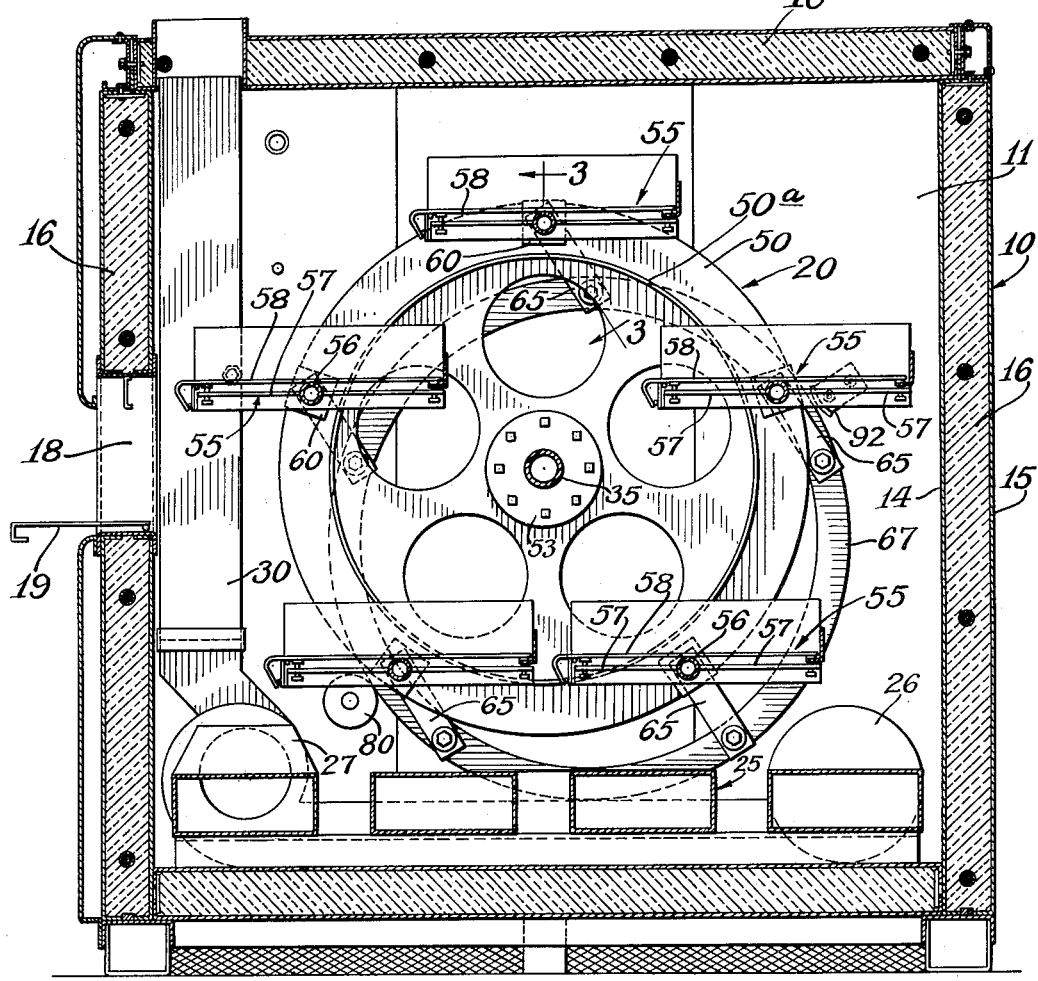
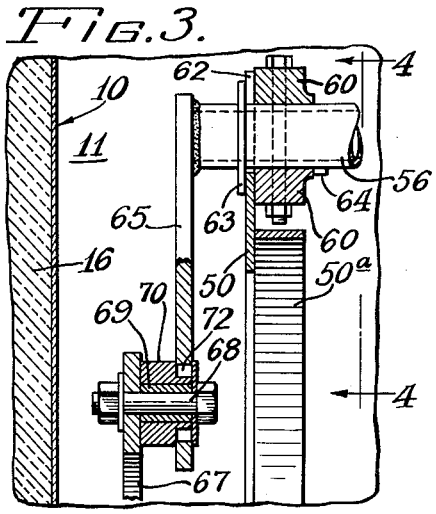
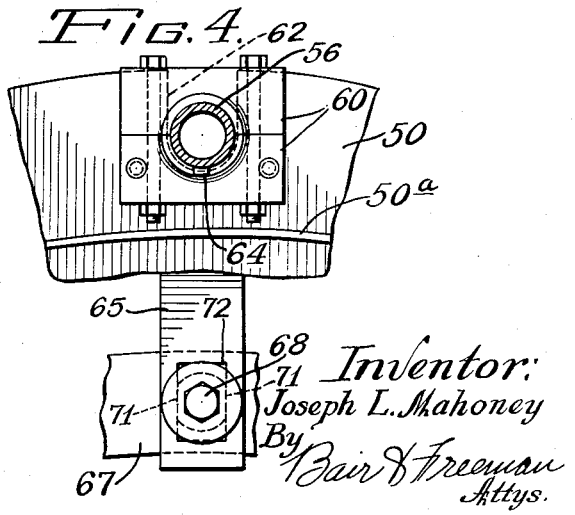

Nov. 29, 1955  J. L. MAHONEY  2,725,020
STABILIZER FOR REEL OVEN
Filed March 5, 1949  3 Sheets-Sheet 3
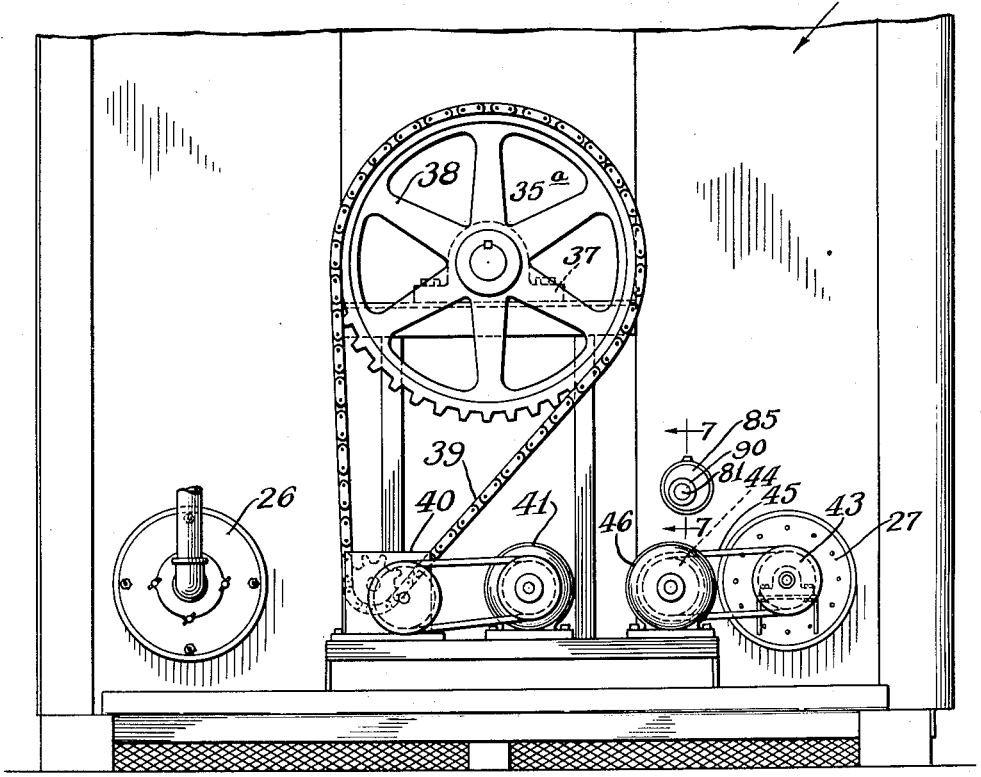
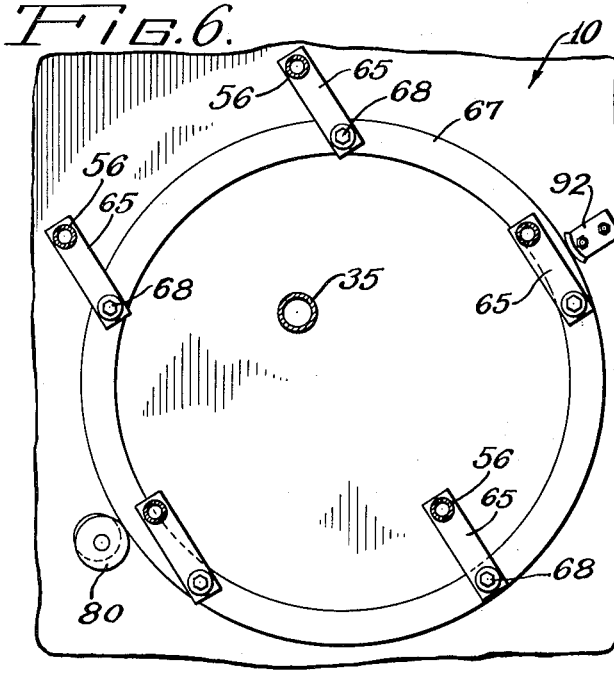
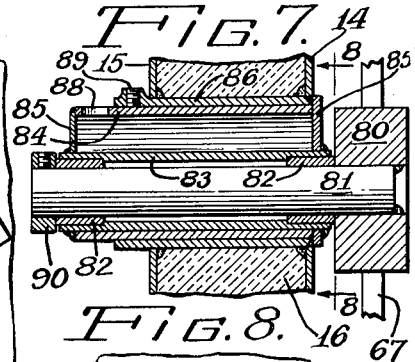
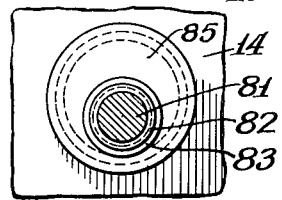
Inventor:
Joseph L. Mahoney
By Baird Freeman
Attys.

United States Patent Office

2,725,020
Patented Nov. 29, 1955

2,725,020
STABILIZER FOR REEL OVEN

Joseph L. Mahoney, Franklin Park, Ill., assignor to The Petersen Oven Company, Franklin Park, Ill., a corporation of Illinois Application March 5, 1949, Serial No. 79,761
1 Claim. (Cl. 107—59)

The present invention relates to a commercial baking oven of the general type designated as "reel" ovens.

Ovens of this general type are adapted for baking or heating various materials, and are especially suitable for bakeries having moderate or small production requirements, or where space limitations are important factors. Reel-type ovens, as heretofore produced, comprise a reel assembly, mounted within a heated baking chamber, for rotation about a substantially horizontally extending axis. The reel is provided with a plurality of circumferentially spaced apart trays for supporting foodstuffs or other materials, while being baked within the oven chamber. Ovens of this general type, as heretofore constructed, usually have their trays mounted for free pivotal movement, and are hence subject to a certain amount of swinging movement. Due to such mounting of the trays, the swinging movement frequently imparts a vibratory or jiggling action in the entire reel assembly. Reels with the trays so supported thereon have given rise to numerous problems and disadvantages, such as in loading and unloading of the trays. Furthermore such swinging and jiggling action of the trays frequently results in impairment of the characteristics of the material being baked, and sometimes results in the trays assuming a slightly tilted position in their course of travel in the baking chamber, resulting in the body of the materials, such as foodstuffs, sloping toward one end, and thus resulting in non-uniform appearance of the baked product, as well as non-uniform baking of the entire body of material or product.

An object of the invention is to provide novel stabilizing means for trays of a reel type oven together with means for quickly and easily adjusting the stabilizing means from the exterior of the oven for insuring proper positioning of the trays in horizontal planes and thereby compensate for wear, as well as slight misalignment of the parts such as sometimes occurs due to warping resulting from expansion and contraction of the metal elements in the baking chamber.

Another object is to provide a novel stabilizing construction, for the pivoted trays of a reel type oven, which is efficient and durable in operation and which is capable of being economically manufactured.

Other objects and advantages of this invention will be apparent from the following description, taken in connection with the accompanying drawings in which:

Figure 2 is a transverse sectional view through the oven, taken substantially as indicated at line 2—2 on Figure 1;

Figure 3 is an enlarged fragmentary view, partly in section, through the stabilizing or control arm and its connection to a tray, and taken substantially as indicated at line 3—3 on Figure 2;

Figure 4 is a fragmentary view taken at line 4—4 on Figure 3;

Figure 5 is an end view of the oven proper, taken substantially at line 5—5 on Figure 1, showing the drive mechanism and other appurtenances;

Figure 6 is a detail view of the stabilizer ring and control arms, taken substantially as indicated at line 6—6 on Figure 1;

Figure 7 is an enlarged sectional view through the eccentric mounting for the roller guide of the stabilizer ring, and taken substantially as indicated at line 7—7 on Figure 5; and Figure 8 is a fragmentary view showing the inner end portion of the eccentric mounting, taken substantially as indicated at line 8—8 on Figure 7.

Figure 1:
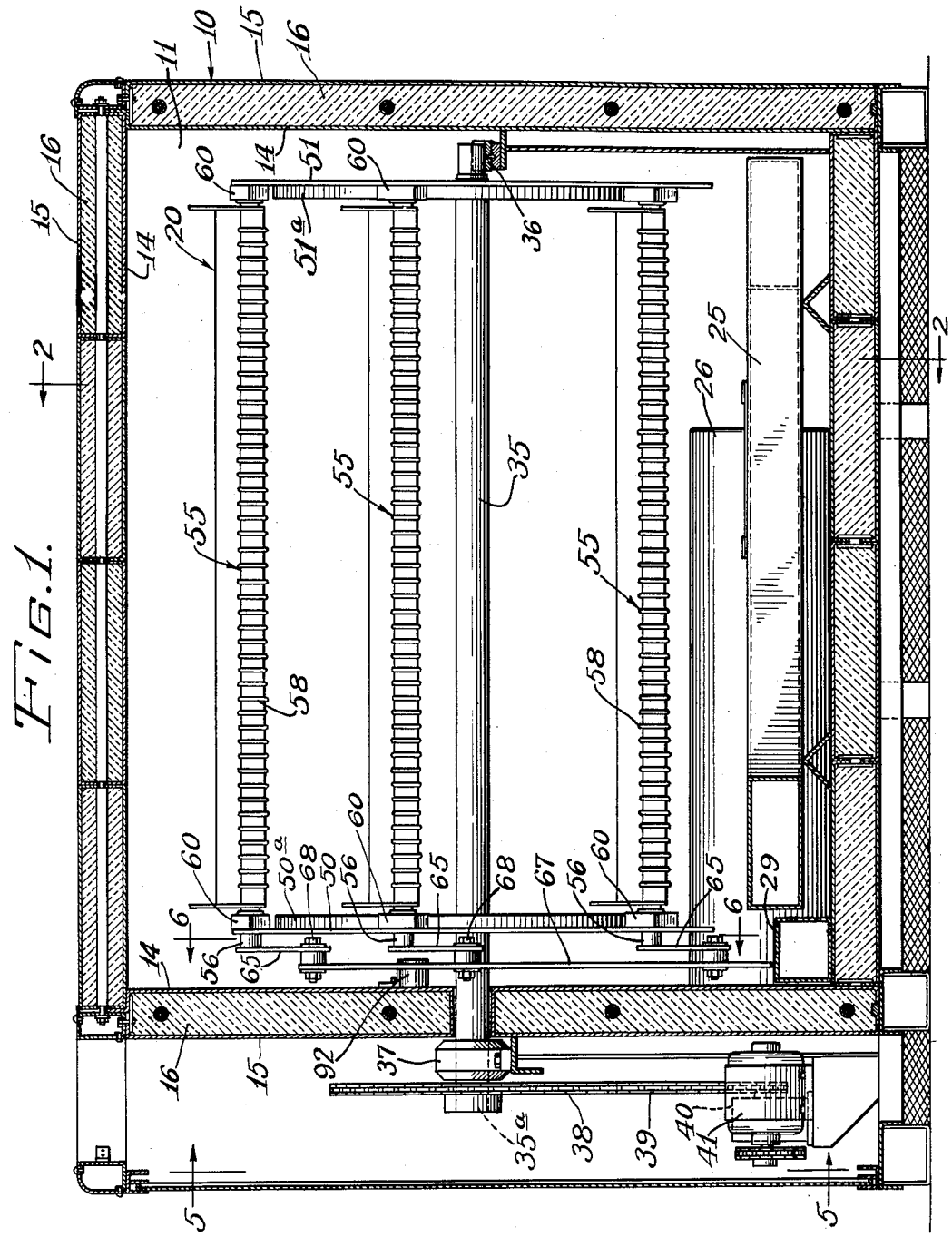
Figure 1 is a vertical sectional view through a reel oven provided with stabilizing means embodying the present invention.

The reel oven as illustrated in the drawings includes a walled enclosure indicated generally at 10 defining a baking chamber 11. The walls comprising the side walls and the top and bottom walls are preferably formed of a multiplicity of prefabricated panel elements interconnected together, and each of the panel elements comprises a pair of spaced apart inner and outer plates 14 and 15, between which is disposed a body of heat insulating material 16. The panel construction herein referred to does not constitute any part of the present invention.

The front wall of the oven, as may be seen in Figure 2, is provided with a suitable horizontally extending elongated opening 18, adapted to normally be closed by a hinged door 19. Said opening affords access to the interior of the baking chamber 11 for the passage of foodstuffs or other materials therethrough for loading and unloading with respect to a reel assembly indicated generally at 20.

Disposed in close proximity to the bottom wall of the oven, within the chamber 11, is a unitary heat exchanger 25 which does not constitute a part of the present invention. The heat exchanger is connected at one end to a heater unit indicated generally at 26, fired with any suitable fuel. The opposite end of said heat exchanger communicates with the housing of a blower 27 by a duct 29 through which a portion of the heated air passing through the heat exchanger 25 is returned for re-circulation within the system. The blower housing is also provided with a suitable outlet duct to a vent stack indicated at 30.

The reel assembly 20 includes a tubular shaft 35 with a plug 35a in its left hand end, journaled at its ends in bearings 36 and 37 carried by the opposite end walls of the oven. It will be noted in Figure 1 of the drawings said shaft protrudes through the left hand end wall and the bearing 37 is located externally of said wall. Mounted on the outer end of said shaft outside of the baking chamber is a sprocket wheel 38 for rotating the reel assembly. Said sprocket wheel is driven by a chain 39 from a speed reducer mechanism indicated generally at 40 which in turn is driven by a motor 41. As may be seen in Figure 5 of the drawings, said drive mechanism is located adjacent the exterior of the end wall of the oven. At the same end of the oven, the blower 27, through pulleys 43, 44 and a belt 45, is driven by a separate motor as indicated at 46.

The reel assembly comprises a pair of axially spaced apart end plates 50 and 51, bolted to suitable flanges 53, welded on said tubular shaft 35. For purposes of reinforcement, the end plates are provided with annular ribs or flanges indicated at 50a and 51a respectively. Supported by the end plates are a plurality of circumferentially and equidistantly spaced apart trays, indicated generally at 55. Each of the trays includes an elongated tubular main supporting element 56 to which are rigidly secured laterally extending supporting arms 57 and on which arms is mounted a grille 58. The tray assemblies are of a unitary nature, and are each totally supported by the main tubular element 56. The opposite ends of the main tubuar element of each tray are journaled in split bearings indicated at 60, mounted on the inner faces of the end plates 50 and 51 as seen in Figures 1, 3 and 4 of the drawings. The lower half of each bearing 60 is rigidly attached to the end plate 50 or 51 and the upper half of said bearing is firmly bolted to the lower half. The outer peripheral edge of the end plate 50 is notched at equal circumferentially spaced points as indicated at 62, to provide clearance for the projecting end portions of the tubular elements 56 when mounting in the bearings 60.

It will be apparent that by virtue of the construction thus far described, each of the tray assemblies is free to swing about the axis of the tubular element 56. To confine the trays in position between the end plates 50 and 51 the tubular elements each have welded thereon, adjacent the left hand end, a flange or washer-like element 63, adapted to abut against the outer surface of the end plate, and a lug 64 located to abut the inner face of the bearing 60, as may be seen in Figure 3 of the drawings.

The tubular elements 56 of the respective trays at the left hand end of the reel assembly, project a short distance beyond the end plate 50, and rigidly secured to the end of each of said tubular elements 56 is a stabilizer or control arm 65 which, as may be seen in the drawings, extends in a downwardly inclined direction. The other end of each of the control arms 65 is pivotally connected to a stabilizer ring 67 by means of a bolt 68 extending through a bushing 69 on which is mounted a spacer element 70, as may be clearly seen in Figures 3 and 4 of the drawings. One end of the spacer element is reduced and formed with a pair of flat parallel faces as indicated at 71 for a sliding and guided fit within a rectangular slot 72 formed in the lower end of the control arm 65. The purpose of the slotted arrangement described is to permit a slight amount of relative movement between the control arms and the stabilizer ring 67 to take care of slight inaccuracy in manufacture and assembly.

By reason of the connection of the stabilizer ring to the reel assembly by means of the control arms 65 in the manner described, said ring tends to assume a position with its axis located below the axis of the main reel shaft 35, as may be clearly seen in Figures 2 and 6 of the drawings. The pivotal connections between the control arms and the stabilizer ring are at equal circumferentially spaced apart points on the ring and all of the control arms assume a position in substantially parallel relation to each other. The radius of a circle of the ring, passing through the axes of the pivot connections to the control arms is substantially equal to the radius of a circle passing through the axes of the tubular elements 56 of the reel assembly. Thus it will be apparent that by movement of the stabilizing ring corresponding movement is imparted to the tray assemblies 55, through their tubular elements 56. Thus it is desirable that the stabilizer ring 67 be caused to assume a position of adjustment at which the main supporting surfaces of the grilles of the respective tray assemblies are disposed in substantially horizontal planes. For this purpose I provide a restraining roller 80 positioned in engagement with the outer periphery of the stabilizer ring, as clearly seen in Figures 2 and 6 of the drawings. It will be apparent, however, that the restraining roller for positioning of said ring may be located other than at a point below the axis of rotation of the ring, for example, above the axis of the ring so as to coact with the inner peripheral edge of said ring. It will be apparent, as may be seen in Figure 6 of the drawings, that in the absence of the roller 80, said stabilizer ring will tend to assume a position with its axis in approximate vertical alignment with the axis of the shaft 35. The roller 80 is mounted on and welded to a shaft 81, which in turn is journaled in bearings 82, press-fitted in the ends of a tube 83, constituting a part of an eccentric assembly. Said tube and shaft are mounted eccentrically within a tubular shell 84 and are interconnected by end plates 85, welded to the shell and tube. The eccentric assembly is journal supported in a sleeve 86 which is welded to the spaced inner and outer plates 14 and 15 of a panel element of the end wall of the oven, as seen in Figure 7 of the drawings. Said shell 84 extends a short distance exteriorly of and beyond the end of the sleeve 86 outside of the oven chamber, and is provided with an opening 88 for the reception of a suitable tool or implement by virtue of which the shell 84 together with the tube 83, shaft 81 and roller 80 may be rotated within the sleeve 86 for varying the position of the roller 80 with respect to the axis of the reel shaft 35 and thereby varying the position of the stabilizing ring 67 relatively to said axis of said reel shaft, and shifting of the control arms 65. Thus by such an adjustment it is possible to so position the stabilizing ring 67 as to insure that the tray assemblies 55 are disposed in substantially horizontal planes. The shell 84 of the eccentric assembly, after proper adjustment of the stabilizing ring, may be secured in fixed position within the sleeve 86 by means of a set screw 89 carried by the sleeve 86 and engaging the outer surface of the shell 84. The roller 80 and its shaft 81 are maintained in axial position within the eccentric assembly by means of a collar indicated at 90 on the outer end of said shaft 81.

It will be apparent that the tray assemblies may be quickly and easily adjusted from the exterior of the oven by the eccentric mounting and support for the roller 80, so that the trays may be caused to assume a substantially horizontal position, thus making it possible to readily and easily make necessary adjustments for compensating for wear in the reel assembly.

To assist in confining the stabilizing ring 67 in engagement with the roller 80, and to reduce to a practical minimum any vibratory action in the reel assembly due to the stabilizing ring, said ring is confined in engagement with the roller 80 by a shoe indicated at 92, disposed in substantially opposite relation to the roller 80. The shoe is adjustably mounted on the inner wall of the oven at a position so as to provide proper guidance for the stabilizer ring as it rotates with the reel assembly.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claim.

I claim as my invention:

In a reel-type baking oven comprising a walled enclosure defining a baking chamber, a reel mounted in said chamber for rotation about a substantially horizontal axis, said reel comprising a pair of axially spaced-apart end plates, a plurality of circumferentially spaced apart trays, pivotally mounted on said end plates, a control arm rigidly attached at one end to one end of each of the respective trays, a ring pivotally connected to the other ends of said arms at substantially equal, circumferentially spaced points; the improvement comprising a roller positioned to engage the marginal edge of the ring to confine it to a predetermined path of travel, incident to rotation of the reel, mounting means for said roller journaled in the wall of the oven about an axis located eccentrically to the axis of said roller, said means being rotatably adjustable for varying the position of the roller and thereby varying the path of travel of said ring, said means having a portion extending exteriorly of the oven wall and formed to be engaged by a suitable implement to effect said rotatable adjustment thereof, and means for locking said mounting means in a fixed position of adjustment.

References Cited in the file of this patent
UNITED STATES PATENTS

| | | |
|---|---|---|
| 789,917 | Jordan | May 16, 1905 |
| 2,002,655 | Bolling | May 28, 1935 |
| 2,106,052 | Faulds | Jan. 18, 1938 |
| 2,149,439 | Hatch | Mar. 7, 1939 |
| 2,201,231 | Haupt | May 21, 1940 |